(12) United States Patent
Jun et al.

(10) Patent No.: US 11,232,525 B2
(45) Date of Patent: Jan. 25, 2022

(54) METHOD AND APPARATUS FOR MEASURING INFLUENCE ON SOCIAL NETWORK

(71) Applicant: OMNIOUS CO., LTD., Daejeon (KR)

(72) Inventors: Jae Young Jun, Daejeon (KR); Hyun Jin Lee, Seoul (KR)

(73) Assignee: OMNIOUS CO., LTD., Daejeon (KR)

( * ) Notice: Subject to any disclaimer, the term of this patent is extended or adjusted under 35 U.S.C. 154(b) by 188 days.

(21) Appl. No.: 16/684,318

(22) Filed: Nov. 14, 2019

(65) Prior Publication Data

US 2020/0082476 A1 Mar. 12, 2020

Related U.S. Application Data

(63) Continuation of application No. PCT/KR2018/007925, filed on Jul. 12, 2018.

(30) Foreign Application Priority Data

Jun. 11, 2018 (KR) .................. 10-2018-0066604

(51) Int. Cl.
*G06Q 10/00* (2012.01)
*G06Q 50/00* (2012.01)
(Continued)

(52) U.S. Cl.
CPC ......... *G06Q 50/01* (2013.01); *G06F 16/9535* (2019.01); *G06Q 30/02* (2013.01); *H04L 51/32* (2013.01); *H04L 67/306* (2013.01)

(58) Field of Classification Search
CPC ........ G06Q 50/01; G06Q 30/02; G06Q 50/00; G06Q 50/10; G06F 16/9535; H04L 51/32; H04L 67/306
See application file for complete search history.

(56) References Cited

U.S. PATENT DOCUMENTS

| | | | |
|---|---|---|---|
| 10,684,738 B1 * | 6/2020 | Sicora | G06F 16/435 |
| 2009/0307057 A1 * | 12/2009 | Azout | G06Q 30/02 |
| | | | 705/7.29 |

(Continued)

FOREIGN PATENT DOCUMENTS

| | | |
|---|---|---|
| KR | 10-1302507 B1 | 9/2013 |
| KR | 10-2014-0094052 A | 7/2014 |
| KR | 10-2017-0026264 A | 3/2017 |

OTHER PUBLICATIONS

"Image Popularity Prediction in Social Media Using Sentiment and Context Features". Francesco Gelli, Tiberio Uricchio, Marco Bertini, Alberto Del Bimbo, Shih-Fu Chang. MM'15, Oct. 26-30, 2015, Brisbane, Australia. DOI: http://dx.doi.org/10.1145/2733373. 2806361.*

(Continued)

*Primary Examiner* — Gabrielle A McCormick
(74) *Attorney, Agent, or Firm* — Studebaker & Brackett PC (57) ABSTRACT

A method for measuring influence on a social network is provided. The method includes collecting social network service (SNS) data from an SNS, measuring a user influence index based on user account information among the SNS data and content information associated with the user account information, measuring an attribute influence value for an attribute included in image information based on the image information among the SNS data, measuring a product influence value for product information based on the user influence coefficient and the attribute influence value with respect to content including the product information, and curating the content including the product information based on the product influence value.

9 Claims, 7 Drawing Sheets

(51) Int. Cl.
*G06F 16/9535* (2019.01)
*G06Q 30/02* (2012.01)
*H04L 12/58* (2006.01)
*H04L 29/08* (2006.01)

(56) References Cited

U.S. PATENT DOCUMENTS

| | | | |
|---|---|---|---|
| 2012/0209786 A1* | 8/2012 | Shah | G06Q 30/02 |
| | | | 705/319 |
| 2014/0143013 A1* | 5/2014 | Pavlidis | G06Q 30/0202 |
| | | | 705/7.31 |
| 2015/0019474 A1* | 1/2015 | Barbieri | G06Q 50/01 |
| | | | 706/53 |
| 2016/0246896 A1* | 8/2016 | Arora | G06F 16/9535 |
| 2017/0132688 A1* | 5/2017 | Freund | G06Q 50/01 |
| 2019/0325498 A1* | 10/2019 | Clark | G06K 7/1417 |

OTHER PUBLICATIONS

"Towards Understanding User Preferences from User Tagging Behavior for Personalization". Nwana, Amandianeze 0. • Chen, Tshuan. arXiv:1507.05150v2 [cs.MM] Nov. 20, 2015.*
Office Action issued in KR 10-2018-0066604; mailed by the Korean Patent Office dated Jun. 17, 2019.
International Search Report issued in PCT/KR2018/007925; dated Mar. 11, 2019.

* cited by examiner

METHOD AND APPARATUS FOR MEASURING INFLUENCE ON SOCIAL NETWORK

CROSS-REFERENCE TO RELATED APPLICATIONS

The present application is a continuation of International Patent Application No. PCT/KR2018/007925, filed Jul. 12, 2018, which is based upon and claims the benefit of priority to Korean Patent Application No. 10-2018-0066604, filed on Jun. 11, 2018. The disclosures of the above-listed applications are hereby incorporated by reference herein in their entirety.

BACKGROUND

Embodiments of the inventive concept described herein relate to a method and apparatus for measuring influence on a social network.

A social network service (SNS) that supports to build a relationship with unspecified individuals and communicate with them online has been provided. Furthermore, with the population of smartphones, there has been an increase in online accessibility, and thus there has been an increase in the utilization ratio of the SNS. Such an SNS starts to function as a new purchase channel, and content which exists on the SNS also starts to be used for marketing purposes.

Meanwhile, the patent document (U.S. Patent Application No. 20170132688) provides a method for calculating an advertisement price based on influence of an influential user on an SNS, that is, an influencer. However, it does not describe a method for directly evaluating content. Thus, there is a need for a method for evaluating whether content has a value of any degree and is usable on an SNS.

SUMMARY

Embodiments of the inventive concept provide a method and apparatus for measuring influence on a social network.

Embodiments of the inventive concept provide a method and apparatus for dynamically evaluating influence of a product based on influence on a social network and image tagging.

Embodiments of the inventive concept provide a method and apparatus for dynamically reflecting influence on a social network to recommend a product and post an advertisement.

According to an exemplary embodiment, a method for measuring influence, performed by an apparatus for measuring influence on a social network, may include collecting social network service (SNS) data from an SNS, measuring a user influence index based on user account information among the SNS data and content information associated with the user account information, measuring an attribute influence value for an attribute included in image information based on the image information among the SNS data, measuring a product influence value for product information based on the user influence index and the attribute influence value with respect to content including the product information, and curating the content including the product information based on the product influence value.

In an embodiment of the inventive concept, the measuring of the attribute influence value may include obtaining recent image information associated with the user account information from the SNS data, applying image tagging to the recent image information to extract at least one attribute included in the image information, and measuring an attribute influence value for the at least one attribute.

In an embodiment of the inventive concept, the extracting of the at least one attribute may include deriving at least one influential user based on the user influence index and obtaining recent image information from content information associated with user account information of the at least one influential user and extracting the at least one attribute. The measuring of the attribute influence value may include measuring an attribute influence value for the at least one attribute based on a user influence index for the at least one influential user.

In an embodiment of the inventive concept, the measuring of the attribute influence value may further include normalizing an attribute influence value for the at least one attribute in a corresponding class to which the at least one attribute belongs.

In an embodiment of the inventive concept, the measuring of the attribute influence value may further include mapping the attribute influence value for each attribute and storing the mapped information in an attribute database.

In an embodiment of the inventive concept, the measuring of the product influence value may include obtaining the content including the product information from a user, applying image tagging to the content including the product information to extract at least one product attribute, obtaining an attribute influence value corresponding to the at least one product attribute from the attribute database, and measuring a product influence value for the content including the product information based on the obtained attribute influence value.

In an embodiment of the inventive concept, the measuring of the product influence value may further include mapping the product influence value for each product and storing the mapped information in a product attribute database. The curating of the content including the product information may include detecting and curating content having a product influence value matched to a predetermined condition from the product attribute database.

In an embodiment of the inventive concept, the predetermined condition may be set on the basis of a rating of the product influence value or on the basis of a degree similar to the product information included in the content.

In an embodiment of the inventive concept, the collecting of the SNS data may include collecting and updating new SNS data at a predetermined period from the SNS.

According to an exemplary embodiment, an apparatus for measuring influence on a social network may include a data collection unit that collects SNS data from an SNS, an influence measurement unit that measures a user influence index based on user account information among the SNS data and content information associated with the user account information, measures an attribute influence value for an attribute included in image information based on the image information among the SNS data, and measures a product influence value for product information based on the user influence index and the attribute influence value with respect to content including the product information, and a content curation unit that curates the content including the product information based on the product influence value.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of one or more other elements other than stated elements but do not exclude presence of additional elements. Like reference numerals designate like elements throughout the specification, and the term "and/or" may include each of stated elements and one or more combinations of the stated elements. The terms such as "first" and "second" are used to describe various elements, but it is obvious that such elements are not restricted to the above terms. The above terms are used only to distinguish one element from the other. Thus, it is obvious that a first element described hereinafter may be a second element within the technical scope of the inventive concept.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Hereinafter, a description will be given in detail of embodiments of the inventive concept with reference to the accompanying drawings.

Figure 1:
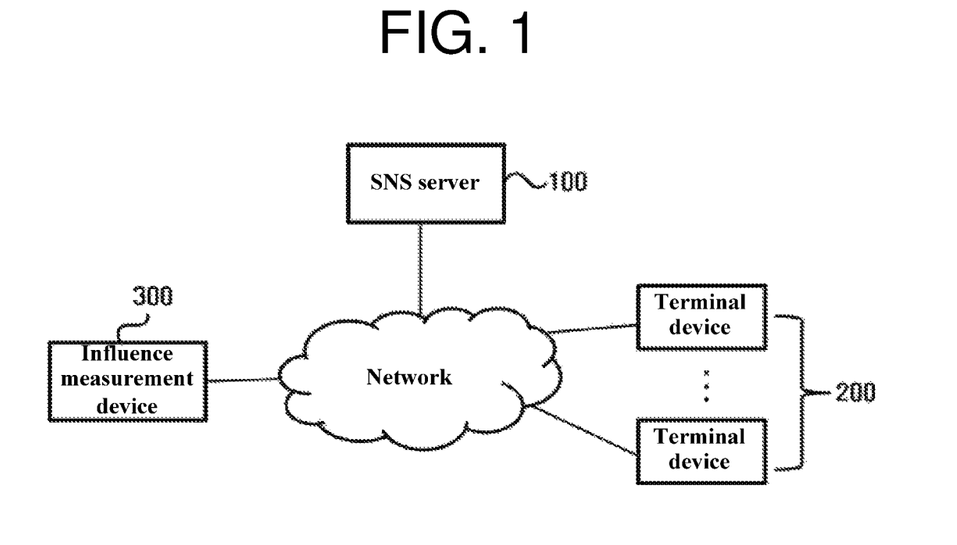
FIG. 1 is a block diagram schematically illustrating a system for measuring influence on a social network according to an embodiment of the inventive concept.

FIG. 1 is a block diagram schematically illustrating a system for measuring influence on a social network according to an embodiment of the inventive concept.

Referring to FIG. 1, a system 10 for measuring influence on a social network according to an embodiment of the inventive concept (hereinafter referred to as "influence measurement system") may include a social network service (SNS) server 100, a terminal device 200, and an influence measurement device 300.

The SNS server 100 may be a server device of a service provider (e.g., Twitter, Facebook, Instagram, KakaoStory, or the like) which provides an SNS and may serve personal relationship building and information exchange to an SNS user using the terminal device 200. Furthermore, the SNS server 100 may assign an SNS account to a user (e.g., a personal user, a content provider, or the like) who wants to use an SNS to allow the user to use various services of posting a variety of content using the assigned account or querying for content posted by other people. For convenience of description, in FIG. 1, the one SNS server 100 is shown. However, the SNS server 100 in the specification refers to including various SNS servers constructed for each SNS service provider.

The terminal device 200 may be a terminal device of a user who uses an SNS provided through the SNS server 100 and may be one of various computing devices, for example, a smartphone, a tablet personal computer (PC), a desktop, a notebook, and a smart TV.

The influence measurement device 300 may collect various SNS data posed on the SNS from the SNS server 100 and may evaluate influence over a variety of information included in the collected SNS data using the collected SNS data. Furthermore, the influence measurement device 300 may provide curated content to a user who has various purposes, based on evaluating the influence over the variety of information included in the SNS data. A description will be given in detail of a detailed operation of the influence measurement device 300.

Figure 2:
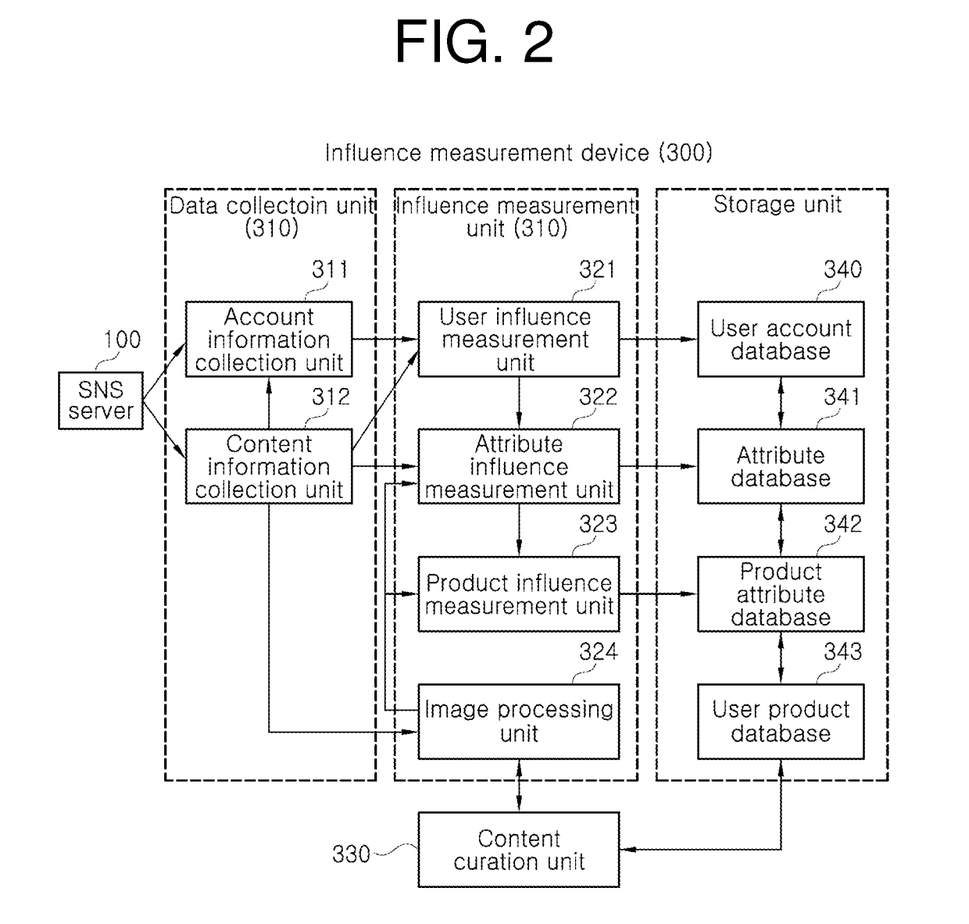
FIG. 2 is a block diagram illustrating a configuration of an apparatus for measuring influence on a social network according to an embodiment of the inventive concept.

FIG. 2 is a block diagram illustrating a configuration of an apparatus for measuring influence on a social network according to an embodiment of the inventive concept.

Referring to FIG. 2, an apparatus 300 for measuring influence on a social network according to an embodiment of the inventive concept (hereinafter referred to as "influence measurement device") may include a data collection unit 310, an influence measurement unit 320, and a content curation unit 300.

The data collection unit 310 may collect various SNS data posted on an SNS from an SNS server 100. As an embodiment, the data collection unit 310 may include an account information collection unit 311 for collecting account information of an SNS user from the SNS server 100 and a content information collection unit 312 for collecting content information posed by the SNS user.

The influence measurement unit 320 may evaluate influence over a variety of information included in the SNS data. As an embodiment, the influence measurement unit 320 may include a user influence measurement unit 321, an attribute influence measurement unit 322, and a product influence measurement unit 323.

The user influence measurement unit 321 may measure a user influence index based on the SNS user account information collected by the data collection unit 310 and content information associated with the SNS user account information. In this case, the influence measurement device 300 may map each SNS user account information and a user influence index corresponding to each SNS user account information and may store the mapped information in a user account database 340.

The attribute influence measurement unit 322 may measure an attribute influence value for an attribute included in image information based on the image information among content collected by the data collection unit 310. In this case, the influence measurement device 300 may map the attribute and an attribute influence value corresponding to the attribute and may store the mapped information in an attribute database 341.

The product influence measurement unit 323 may measure a product influence value for product information based on the user influence index and the attribute influence value with respect to content including the product information. In this case, the influence measurement device 300 may map the product information and the product influence value corresponding to the product information and may store the mapped information in a product attribute database 342.

The content curation unit 330 may curate the content information including the product information based on the product influence value and may provide the curated content to a user who has various purposes.

Hereinafter, a description will be given in detail of an operation of each component of the influence measurement device 300 shown in FIG. 2.

Figure 3:
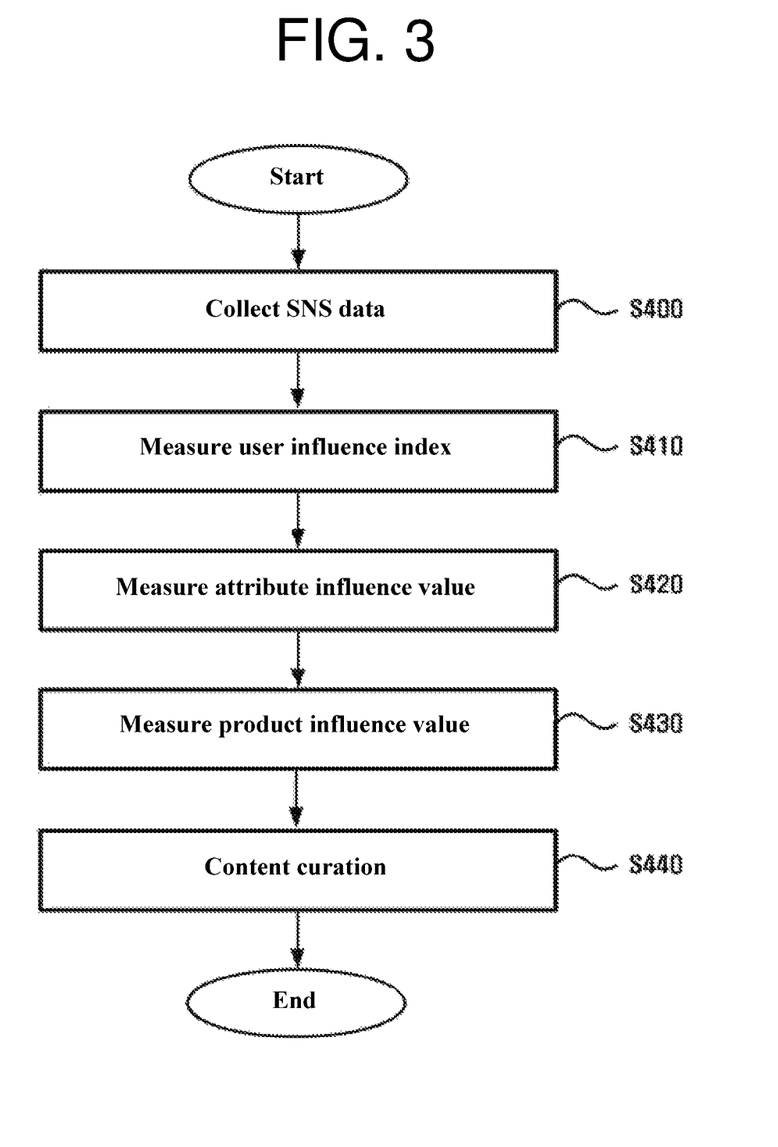
FIG. 3 is a flowchart schematically illustrating a method for measuring influence on a social network according to an embodiment of the inventive concept.

FIG. 3 is a flowchart schematically illustrating a method for measuring influence on a social network according to an embodiment of the inventive concept. A method of FIG. 3 may be performed by an influence measurement device 300 of FIG. 2.

Referring to FIG. 3, in S400, a data collection unit 310 of FIG. 2 may collect various SNS data posted on an SNS from an SNS server 100 of FIG. 2.

As an embodiment, an account information collection unit 311 of FIG. 2 may collect account information of an SNS user registered with the SNS server 100. A content information collection unit 312 of FIG. 2 may collect various content data posted on the SNS from the SNS server 100. In this case, the account information collection unit 311 and the content information collection unit 312 may collect and update user account information and content information at a predetermined period, thus maintaining recent SNS data.

In S410, S420, and S430, an influence measurement unit 320 of FIG. 2 may measure a user influence index, an attribute influence value, and a product influence value based on the collected SNS data.

In detail, in S410, a user influence measurement unit 321 of FIG. 2 may derive a user influence index based on user account information of an SNS user and content information associated with the user account information. Herein, the user account information may include a user account, personal relation information (e.g., a follower, following, or the like) associated with the user account, or the like. The content information associated with the user account information may include additional information (e.g., evaluation information such as the number of comments or likes), for example, the number of content posted through the user account and an interest rate for the content posted through the user account.

As an embodiment, the user influence index may be derived as Equation 1 below. This may be used as a criterion for evaluating whether a user has a certain amount of influence on an SNS.

$$\text{Influence}(A) = \qquad\qquad\qquad\qquad\qquad\qquad [\text{Equation 1}]$$

-continued $$\frac{\text{follower}(\text{user})}{\frac{\sum\limits_{users}^{u} \text{follower}(u)}{n(\text{users})}} * \sqrt{\frac{\sum\limits_{posts(user)}^{p} \text{engagements}(p)^2}{n(\text{posts}(\text{user}))}}$$

Herein, n denotes the number of all the users, follower denotes the number of the followers of the user account, post denotes the number of the posted content, and engagements denote the interest rate (the number of likes, comments, or the like) for the posted content. Thus, Equation 1 above indicates (the mean number of followers of all the users to the number of followers of the corresponding user)*(the root mean square (RMS) of an interest rate per post).

For example, it is assumed that a user pool n (user)=2, an item={coat, skirt, padding} and color={beige, gray}, that user A has 5,000,000 followers, 3 posts, and 1150, 1300, and 1000 likes and comments for each post, and that user B has 2,000,000 followers, 2 posts, and 1000 and 500 likes and comments for each post. User influence indexes for user A and user B may be calculated as the following by applying Equation 1 above.

$$\text{Influence}(A) = \frac{5000000}{\frac{5000000 + 2000000}{2}} * \sqrt{\frac{1150^2 + 1300^2 + 1000^2}{3}} =$$

$$\text{round}(1.4285 \ldots * 1156.5033 \ldots) = 1652.1$$

$$\text{Influence}(B) = \frac{2000000}{\frac{5000000 + 2000000}{2}} * \sqrt{\frac{1000^2 + 500^2}{2}} =$$

$$\text{round}(0.5714 \ldots * 790.5694 \ldots) = 451.8$$

A user influence measurement unit 321 of FIG. 2 may map the derived user account information and the user influence index corresponding to the user account information and may store the mapped information in a user account database 340 of FIG. 2.

In S420, an attribute influence measurement unit 322 of FIG. 2 may derive an attribute influence value for an attribute included in image information based on the image information among content data.

As an embodiment, the attribute influence measurement unit 322 may obtain recent content data associated with the user account information from the content information collection unit 312. According to an embodiment, the attribute influence measurement unit 322 may search the user account database 340 for at least one influential user (an influencer) based on the user influence index to derive the at least one influential user and may obtain recent content data posted through a user account of the at least one derived influential user.

An image processing unit 324 of FIG. 2 may obtain image information from the recent content data and may apply an image tagging technology to the obtained image information to extract at least one attribute included in the image information. For example, the image processing unit 324 may form a model learned using deep learning, a neural network, or the like with respect to the image information and may apply image tagging to the learned model of such an image to extract at least one attribute included in the image information.

The attribute influence measurement unit 322 may derive an attribute influence value for at least one attribute. As an embodiment, the attribute influence value may be derived as Equation 2 below. This may be used as a criterion for evaluating whether a corresponding attribute appears with the frequency of any degree in content of an influential user and has far-reaching power.

$$attscore(attribute) = \sum_{user} \left( influence(user) * \left( \sum_{posts(user)}^{p} (attribute(p)) \right) \right)$$ [Equation 2]

According to Equation 2 above, the attribute influence measurement unit 322 may derive an attribute influence value based on a user influence index for at least one influential user and the frequency of each of attributes included in an image of the at least one influential user.

For example, it is assumed that, for user A, a user influence index is 1652.1 and item={coat 2, skirt 1} and color={gray 2, beige 1} in an attribute extracted from an image included in a recent post and that, for user B, a user influence index is 451.8 and item={long padding 1, skirt 1} and color={beige 2} in an attribute extracted from an image included in a recent post. An attribute influence value for each of attributes based on influential users A and B may be calculated as the following according to Equation 2 above.

Attscore(coat)=1652.1*2=3304.2

Attscore(skirt)=1652.1*1+451.8*1=2103.9

Attscore(long padding)=451.8*1=451.8

Attscore(gray)=1652.1*2=3304.2

Attscore(beige)=1652.1*1+451.8*2=2555.7

According to an embodiment, the attribute influence measurement unit 322 may normalize an attribute influence value on the basis of a class to which a corresponding attribute belongs. As an embodiment, the process of normalizing the attribute influence value may be derived as Equation 3 below. This may be to measure whether a corresponding attribute has a certain amount of influence in one class by adjusting an influence value of the corresponding attribute in a class to which the attribute itself belongs.

$$av(attribute) = \frac{attscore(attribute) - \mu(attscore(attributes_{class(attribute)}))}{\sigma(attscore(attributes_{class(attribute)}))},$$ [Equation 3]

$\mu = the\ entire\ average\ of\ the\ corresponding\ sample,$ $\sigma = the\ standard\ deviation\ of\ the\ corresponding\ sample$ According to Equation 3 above, the attribute influence measurement unit 322 may normalize the attribute influence value at the percentage of an attribute in a class to which the attribute belongs.

For example, it is assumed that, in a class composed of items, an attribute influence value of a coat attribute is 3304.2, an attribute influence value of a skirt attribute is 2103.9, and an attribute influence value of a long padding attribute is 451.8 and that, in a class composed of colors, an attribute influence value of a gray attribute is 3304.2 and an attribute influence value of a beige attribute is 2555.7. Normalizing an attribute influence value for each attribute according to Equation 3 above may be calculated as the following:

$$av(coat) = \frac{3304.2 - 1953.3}{1432.151} = 0.9433$$

$$av(one\text{-}piece\ dress) = \frac{2103.9 - 1953.3}{1432.151} = 0.1051$$

$$av(long\ padding) = \frac{451.8 - 1953.3}{1432.151} = -1.0484$$

$$av(gray) = \frac{3304.2 - 2929.95}{529.2694} = 0.7071$$

$$av(beige) = \frac{2555.7 - 2929.95}{529.2694} = -0.7071$$

The attribute influence measurement unit 322 may map the derived attribute, an attribute influence value corresponding to the derived attribute, and a normalized value of the attribute and may store the mapped information in an attribute database 341 of FIG. 2.

In S430, a product influence measurement unit 323 of FIG. 2 may derive a product influence value for a product included in content based on the user influence index and the attribute influence value with respect to the content including product information.

As an embodiment, the product influence measurement unit 323 may obtain content including product information from a user. For example, the product influence measurement unit 323 may obtain content including product information from a user who purchases a product online through an online shopping mall or the like, a user who wants to advertise a product, or the like. In this case, the user may separately construct and use a database 343 which stores his or her product information. Thus, the influence measurement device 300 may obtain product information from the database 343 of each user.

An image processing unit 324 of FIG. 2 may obtain image information from the content including the product information and may apply image tagging through deep learning, a neural network, or the like to the obtained image information to extract at least one product attribute from the image information.

The product influence measurement unit 323 may measure a product influence value for the content including the product information based on an attribute influence value for at least one extracted product attribute. In this case, the product influence measurement unit 323 may obtain an attribute influence value corresponding to a product attribute from the attribute database 341 and may derive a product influence value. As an embodiment, the product influence value may be derived as Equation 4 below. This may be used as a criterion for evaluating whether content including a product has a certain amount of influence and reflects a trend.

$$iv(image) = \sum_{attribute(image)}^{attr} weight_{class(attr)} * av(attr)$$ [Equation 4]

According to Equation 4 above, the product influence measurement unit 323 may reflect a weight (e.g., a value in which an interest degree, an importance degree, or the like of a class to which a corresponding product attribute belongs is reflected) based on a normalization value of an attribute influence value for each product attribute included in one content to derive a product influence value. Herein, the weight may be variably changed using empirical data.

For example, it is assumed that a normalization value of an attribute influence value for a coat is 0.9433, a normalization value of an attribute influence value for a skirt is 0.1051, a normalization value of an attribute influence value for a long padding is −1.0484, a normalization value of an attribute influence value for a gray is 0.7071, a normalization value of an attribute influence value for a beige is −0.7071 and that, when a weight of an item class is 1 and when a weight of a color class is 0.5, a product attribute that item={coat} and color={beige} is included in first content obtained from a user and a product attribute that item={skirt} and color={gray} is included in second content. A product influence value for a product included in the first content and the second content may be calculated as the following according to Equation 4 above.

$$iv(\text{image 1})=(1*0.9433)+(0.5*-0.7071)=0.58975$$

$$iv(\text{image 2})=(1*0.1051)+(0.5*0.7071)=0.45865$$

The product influence measurement unit 323 may map the derived product attribute and a product influence value corresponding to the derived product attribute and may store the mapped information in the product attribute database 342.

In S440, a content curation unit 330 of FIG. 2 may curate content including product information based on the product influence value.

As an embodiment, the content curation unit 330 may detect product content having a product influence value matched to a predetermined condition from the product attribute database 342 and may provide the detected product content to a user who wants to use the product content. For example, when a rating of the product influence value is set as a condition, the content curation unit 330 may obtain a product attribute with a high product influence value among a variety of content provided by the user from the product attribute database 342 and may provide content in which the product attribute is curated. Alternatively, when similarity of a product is set as a condition, the content curation unit 330 may obtain a product attribute similar to a product included in content provided by the user from the product attribute database 342 and may calculate similarity with the obtained product attribute, thus using the calculated similarity for content curation.

Figure 4:
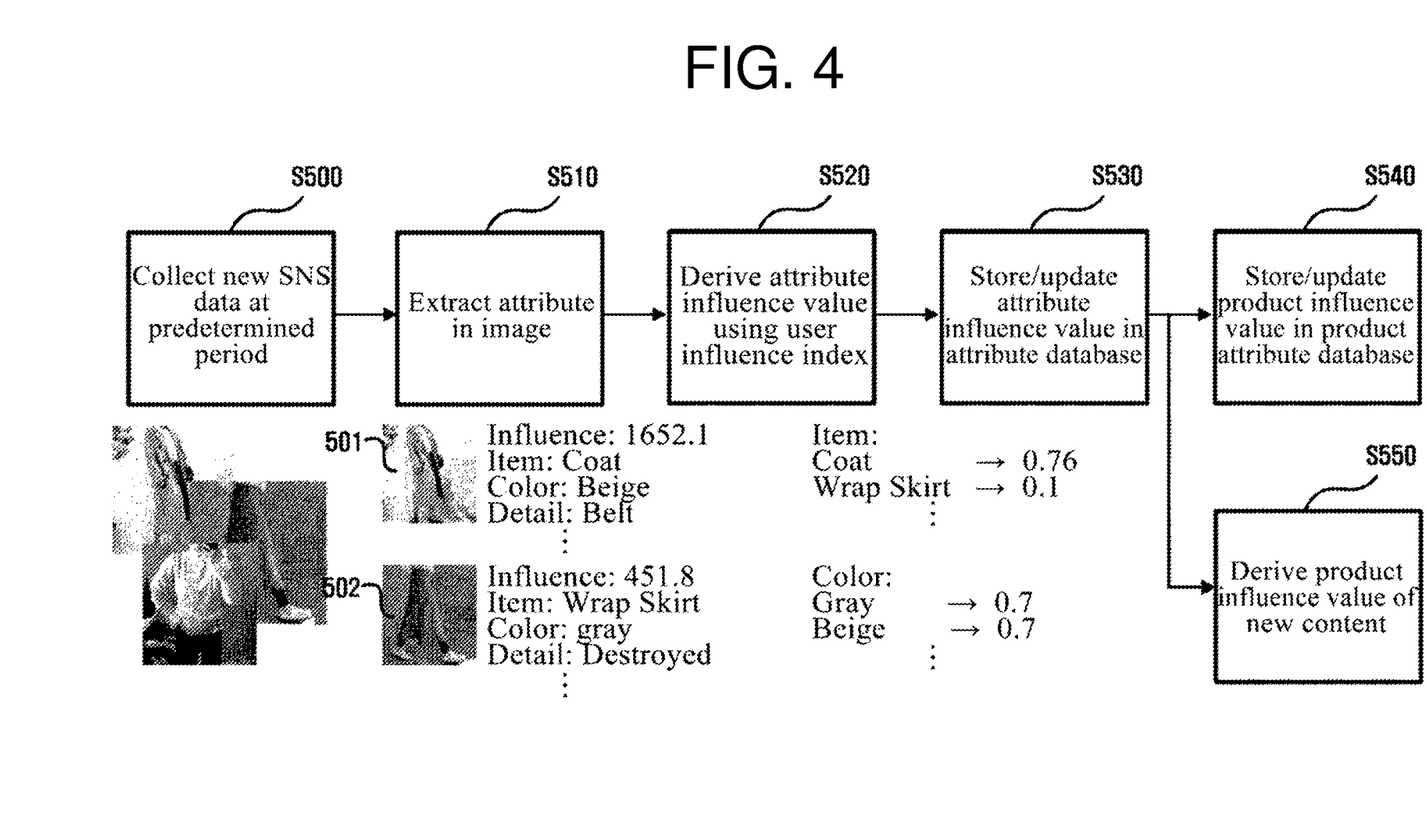
FIG. 4 is a drawing illustrating an example to which a method for measuring influence on a social network according to an embodiment of the inventive concept is applied.

FIG. 4 is a drawing illustrating an example to which a method for measuring influence on a social network according to an embodiment of the inventive concept is applied.

Referring to FIG. 4, in S500, a data collection unit 310 of FIG. 2 may collect new SNS data at a predetermined period. According to an embodiment, the data collection unit 310 may detect an influential user based on a user influence index from a user account database 340 of FIG. 2 and may collect SNS data of the detected user on a periodic basis.

In S510, an influence measurement unit 320 of FIG. 2 may obtain images from the collected SNS data and may extract at least one attribute included in each of the images. According to an embodiment, the influence measurement unit 320 may extract an attribute from only an image newly collected from the SNS data of the influential user.

In S520, the influence measurement unit 320 may measure an attribute influence value for an attribute included in each image using a user influence index for each of the influential users.

For example, as shown in FIG. 4, the influence measurement unit 320 may extract coat, beige, and belt attributes from a first image 501 of a first user and may extract wrap skirt, gray, and destroyed attributes from a second image 502 of a second user. The influence measurement unit 320 may calculate each attribute influence value using a user influence index of each of the first and second users for each of the extracted attributes.

In S530, the influence measurement unit 320 may store each attribute and an attribute influence value corresponding to each attribute in an attribute database 341 of FIG. 2.

When the attribute database 341 is updated, in S540, the influence measurement unit 320 may derive a product influence value using the attribute and the attribute influence value, which are updated in the attribute database 341, thus updating a product attribute database 342 of FIG. 2.

When obtaining content including product information from a user, in S550, the influence measurement unit 320 may measure a product influence value for a product included in content of the user using the attribute and the attribute influence value, which are stored in the attribute database 341.

An embodiment of the inventive concept may collect new SNS data on a periodic basis and may evaluate influence, thus continuing updating product influence and effectively reflecting and using the latest trend at the right time.

Figure 5:
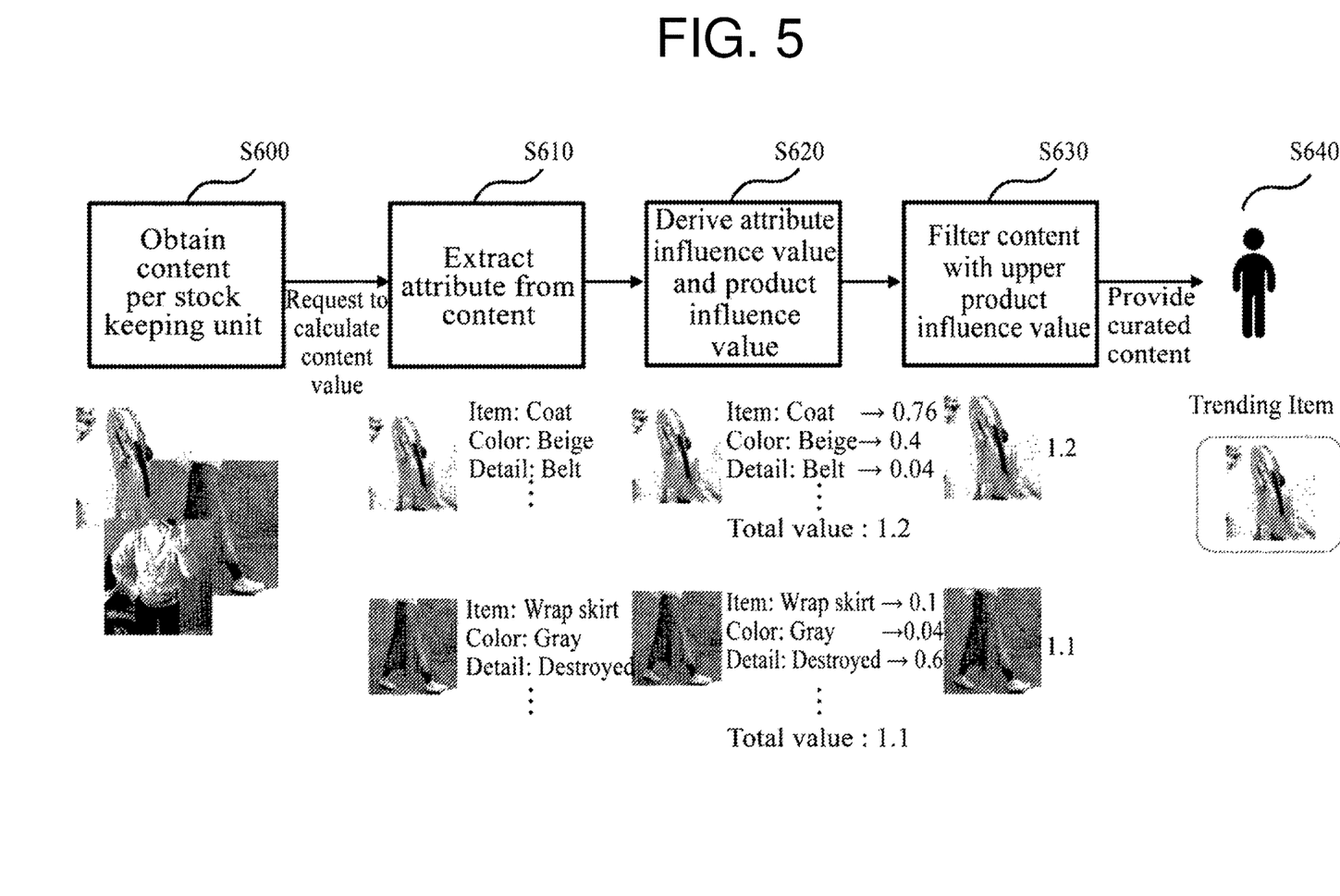
FIGS. 5 and 6 are drawings illustrating other examples to which a method for measuring influence on a social network according to an embodiment of the inventive concept is applied.
Figure 6:
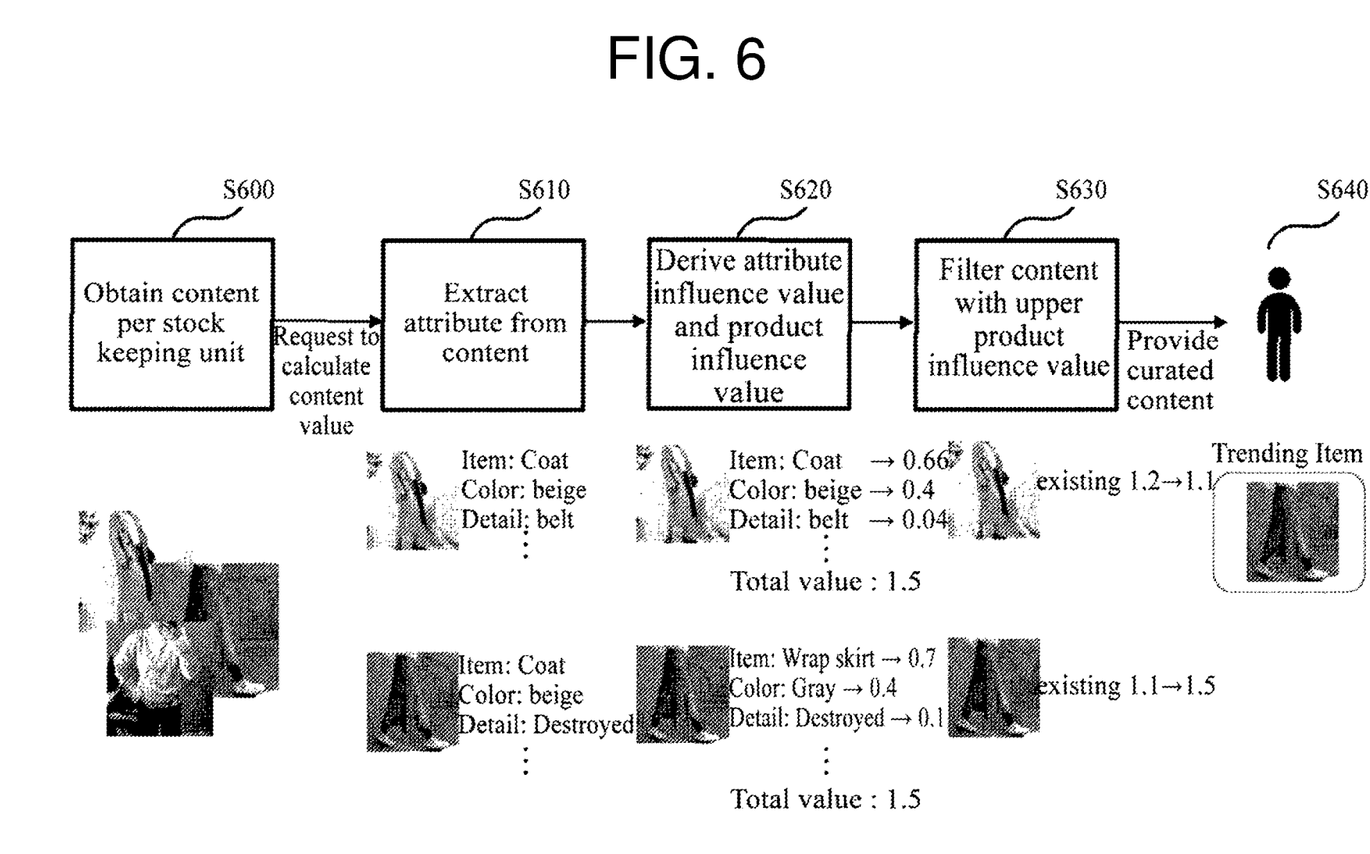

FIGS. 5 and 6 are drawings illustrating other examples to which a method for measuring influence on a social network according to an embodiment of the inventive concept is applied.

Referring to FIGS. 5 and 6, in S600, an influence measurement unit 320 of FIG. 2 may obtain content including product information from a user product database 343 of FIG. 2. As an embodiment, the influence measurement unit 320 may obtain content per stock keeping unit (SKU) from the user product database 343.

In S610, the influence measurement unit 320 may extract attributes from each of the obtained content. In S620, the influence measurement unit 320 may measure an attribute influence value for each of the extracted attributes and may measure a product influence value for each of the content based on each attribute influence value.

In S630, a content curation unit 330 may determine whether it is matched to a predetermined influence value based on the product influence value for each of the obtained content and may filter content matched to a condition as a result of the determination. For example, the content curation unit 330 may select and filter content which is ranked higher in the influence value.

In S640, the content curation unit 330 may curate the filtered content and may provide the curated content to a user. For example, the content curation unit 330 may reflect and provide a product with the highest influence on a social network among content of the user.

As described above, as an attribute database 341 and a product attribute database 342 of FIG. 2 are updated, an attribute influence value and a product influence value may be changed. In this case, the content curation unit 330 may determine whether it is matched to a predetermined condition again based on the updated product influence value from the product attribute database 342 and may filter content. Thus, the content curation unit 330 may continue monitoring a change in trend on the social network, thus dynamically updating content in which a trend is reflected.

Figure 7:
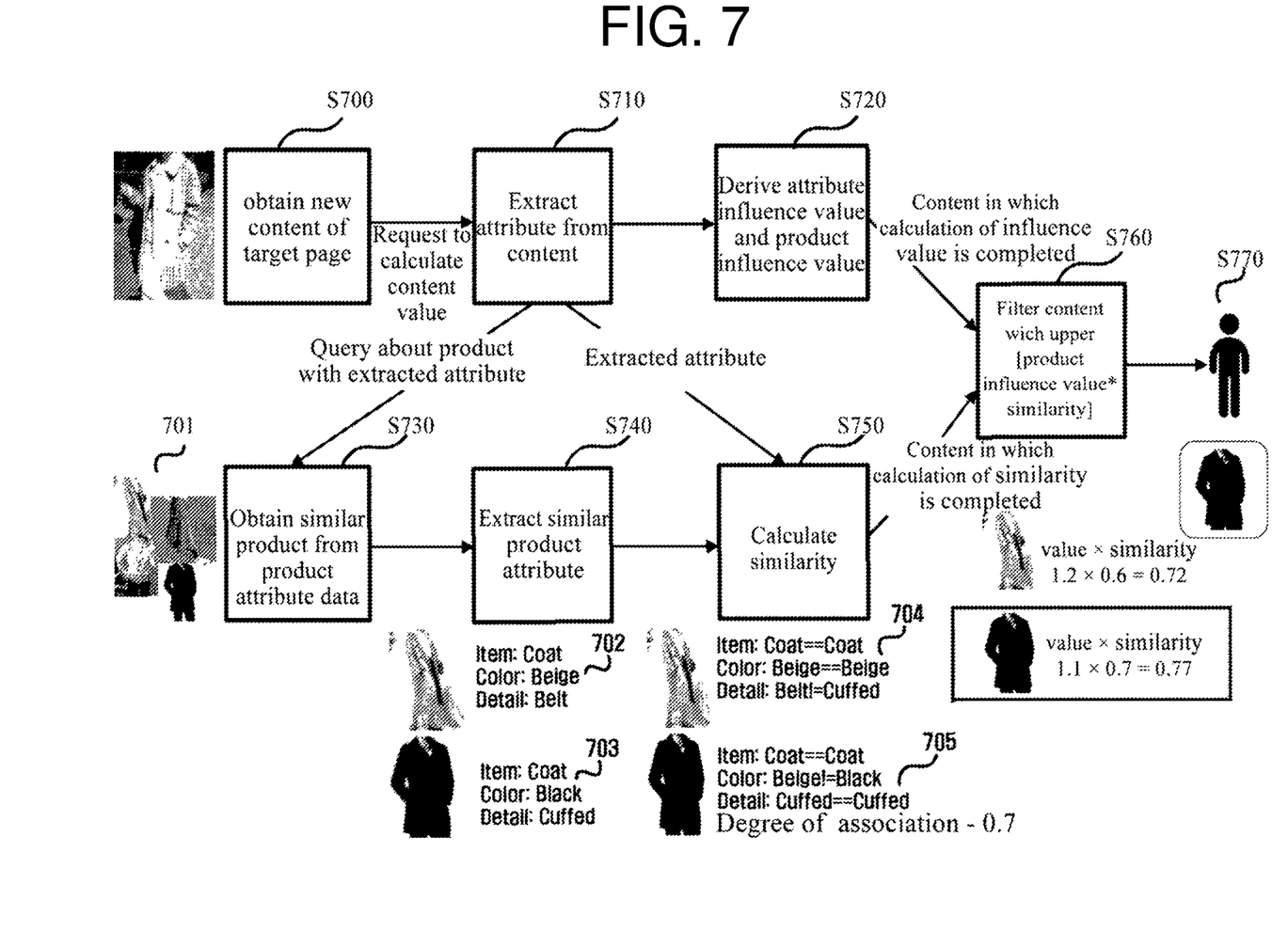
FIG. 7 is a drawing illustrating another example to which a method for measuring influence on a social network according to an embodiment of the inventive concept is applied.

FIG. 7 is a drawing illustrating another example to which a method for measuring influence on a social network according to an embodiment of the inventive concept is applied.

Referring to FIG. 7, in S700, an influence measurement unit 320 of FIG. 2 may obtain content including new product information from a user.

In S710, the influence measurement unit 320 may extract product attributes from the content including the new product information. In S720, the influence measurement unit 320 may measure a product influence value of the content including the product information based on an attribute influence value for each of the extracted product attributes.

Herein, the influence measurement unit 320 may compare products similar to a product included in the content obtained from the user and may evaluate a product influence value.

As an embodiment, in S730, the influence measurement unit 320 may obtain products 701 similar to a product attribute in the content obtained from the user from a product attribute database 342 of FIG. 2. In S740, the influence measurement unit 320 may extract product attributes 702 and 703 from each of the similar products 701. In S750, the influence measurement unit 320 may compare similar degrees (704 and 705) between each of the extracted product attributes 702 and 703 and each of product attributes of the content obtained from the user. The influence measurement unit 320 may derive a similarity of each of similar products depending on the similar degrees 704 and 705 between the attributes. The influence measurement unit 320 may reflect a product similarity in each of the similar products 701 to measure a product influence value.

In S760, a content curation unit 330 may determine whether it is similar to the content obtained from the user based on a product influence value in which the product similarity is reflected and may filter content including the similar product as a result of the determination.

In S770, the content curation unit 330 may curate the filtered content and may provide the curated content to the user.

An embodiment of the inventive concept may reflect a similarity of a product to evaluate influence, thus being effectively used for recommending or matching a similar product, for example, being used for posting an advertisement.

Operations of the method or algorithm described in connection with an embodiment of the inventive concept may be directly implemented in hardware, may be implemented with a software module executed by hardware, or may be implemented by a combination of the hardware and the software module. The software module may reside on a random access memory (RAM), a read only memory (ROM), an erasable programmable ROM (EPROM), an electrically erasable programmable ROM (EEPROM), a flash memory, a hard disc, a removable disc, a CD-ROM, or any type of computer-readable storage medium which is well known in the technical field to which the inventive concept pertains.

An embodiment of the inventive concept may evaluate influence over content based on influence of an influencer on an SNS. Furthermore, an embodiment of the inventive concept may continue monitoring content of the influencer on the SNS to evaluate influence over the content in real time, thus providing a product or advertisement associated with the content at the right time for purposes.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for measuring influence, performed by an apparatus for measuring influence on a social network, the method comprising:
   collecting social network service (SNS) data from an SNS;
   measuring a user influence index based on user account information among the SNS data and content information associated with the user account information;
   measuring an attribute influence value for an attribute included in image information based on the image information among the SNS data of at least one influential user derived based on the user influence index;
   measuring a product influence value for product information based on the attribute influence value with respect to content including the product information,
   wherein the measuring of the product influence value includes:
   obtaining the content including the product information from the SNS data corresponding to the at least one influential user derived based on the user influence index;
   applying image tagging to the content including the product information to extract at least one product attribute;
   obtaining an attribute influence value corresponding to the at least one product attribute from an attribute database; and
   measuring a product influence value for the content including the product information based on the obtained attribute influence value; and
   curating the content including the product information based on the product influence value.

2. The method of claim 1, wherein the measuring of the attribute influence value includes:
   obtaining recent image information associated with the user account information from the SNS data;
   applying image tagging to the recent image information to extract at least one attribute included in the image information; and
   measuring an attribute influence value for the at least one attribute.

3. The method of claim 2, wherein the extracting of the at least one attribute includes:
   obtaining recent image information from content information associated with user account information of the at least one influential user and extracting the at least one attribute, and
   wherein the measuring of the attribute influence value includes:
   measuring an attribute influence value for the at least one attribute based on a user influence index for the at least one influential user.

4. The method of claim 3, wherein the measuring of the attribute influence value further includes:
   normalizing an attribute influence value for the at least one attribute in a corresponding class to which the at least one attribute belongs.

5. The method of claim 3, wherein the measuring of the attribute influence value further includes:

mapping the attribute influence value for each attribute and storing the mapped information in the attribute database.

6. The method of claim 1, wherein the measuring of the product influence value further includes:
mapping the product influence value for each product and storing the mapped information in a product attribute database, and
wherein the curating of the content including the product information includes:
detecting and curating content having a product influence value matched to a predetermined condition from the product attribute database.

7. The method of claim 6, wherein the predetermined condition is set on the basis of a rating of the product influence value or on the basis of a degree similar to the product information included in the content.

8. The method of claim 1, wherein the collecting of the SNS data includes:
collecting and updating new SNS data at a predetermined period from the SNS.

9. An apparatus for measuring influence on a social network, the apparatus comprising:
a data collection unit configured to collect SNS data from an SNS;
an influence measurement unit configured to measure a user influence index based on user account information among the SNS data and content information associated with the user account information, measure an attribute influence value for an attribute included in image information based on the image information among the SNS data of at least one influential user derived based on the user influence index, and measure a product influence value for product information based on the attribute influence value with respect to content including the product information,
wherein the influence measurement unit is further configured to:
obtain the content including the product information from the SNS data corresponding to the at least one influential user derived based on the user influence index;
apply image tagging to the content including the product information to extract at least one product attribute;
obtain an attribute influence value corresponding to the at least one product attribute from an attribute database; and
measure a product influence value for the content including the product information based on the obtained attribute influence value; and
a content curation unit configured to curate the content including the product information based on the product influence value.

* * * * *